United States Patent
Shimomura et al.

[11] Patent Number: 6,064,057
[45] Date of Patent: May 16, 2000

[54] COLOR IMAGE READING APPARATUS

[75] Inventors: Hidekazu Shimomura, Yokohama; Hiroshi Sato, Kawasaki, both of Japan

[73] Assignee: Canon Kabushiki Kaisha, Tokyo, Japan

[21] Appl. No.: 09/041,692

[22] Filed: Mar. 13, 1998

[30] Foreign Application Priority Data

Mar. 14, 1997 [JP] Japan .................................. 9-081980

[51] Int. Cl.$^7$ .................................. H01J 40/14; G01J 3/50
[52] U.S. Cl. .................. 250/226; 250/208.1; 358/518; 359/571
[58] Field of Search .................. 250/226, 208.1, 250/237 G, 237 R; 358/518, 515, 513; 359/563, 566, 571, 589

[56] References Cited

U.S. PATENT DOCUMENTS 5,223,703  6/1993  Setani ................................. 250/208.1
5,844,233  12/1998  Sato ...................................... 250/226

FOREIGN PATENT DOCUMENTS

0 731 598  9/1996  European Pat. Off. .
8-223359  8/1996  Japan .

*Primary Examiner*—Edward P. Westin
*Assistant Examiner*—Kevin Pyo
*Attorney, Agent, or Firm*—Fitzpatrick, Cella, Harper & Scinto

[57] ABSTRACT

In a color image reading apparatus, a plurality of line sensors are arranged on a same substrate and an image of an object is formed on the sensors by an imaging optical system. A blazed diffraction grating is disposed in an optical path between the imaging optical system and the sensors so as to color-separate a light beam from the object into a plurality of color light beams. A correction element such as a plane-parallel glass, prism or the like is disposed in an optical path between the blazed diffraction grating and the sensors so as to correct different imaging positions on the surfaces of the sensors caused by different wavelengths of the plurality of color light beams color-separated by the blazed diffraction grating. By the correction element, respective optical paths of the color light beams are changed utilizing different refractive indices due to different wavelengths upon being transmitted through the correction element so as to make spacing between adjacent color light beams color-separated in a sub scanning direction equal to each other on the surfaces of the sensors.

10 Claims, 7 Drawing Sheets

FIG. 1
PRIOR ART

SUB SCANNING SECTION

FIG. 9A
TYPE A

FIG. 9B
TYPE B

FIG. 9C
TYPE C

COLOR IMAGE READING APPARATUS

BACKGROUND OF THE INVENTION

1. Field of the Invention

The present invention relates to a color image reading apparatus and, more particularly, to a color image reading apparatus, which can read color image information on an original surface with high precision using a simple monolithic 3-line sensor by correcting the asymmetric spacings of a plurality of color-separated light beams in the sub scanning direction on the surface of a light-receiving means caused by different focusing positions (imaging positions) arising from different wavelengths of diffracted light beams color-separated by a color-separation means comprising a reflection or transmission type linear blazed diffraction grating, and is suitable for, e.g., a color scanner, color facsimile, and the like.

2. Related Background Art

Conventionally, various apparatuses for digitally reading color image information using output signals from a line sensor by imaging color image information on an original surface on the surface of the line sensor (CCD) via an optical system have been proposed.

Figure 1:
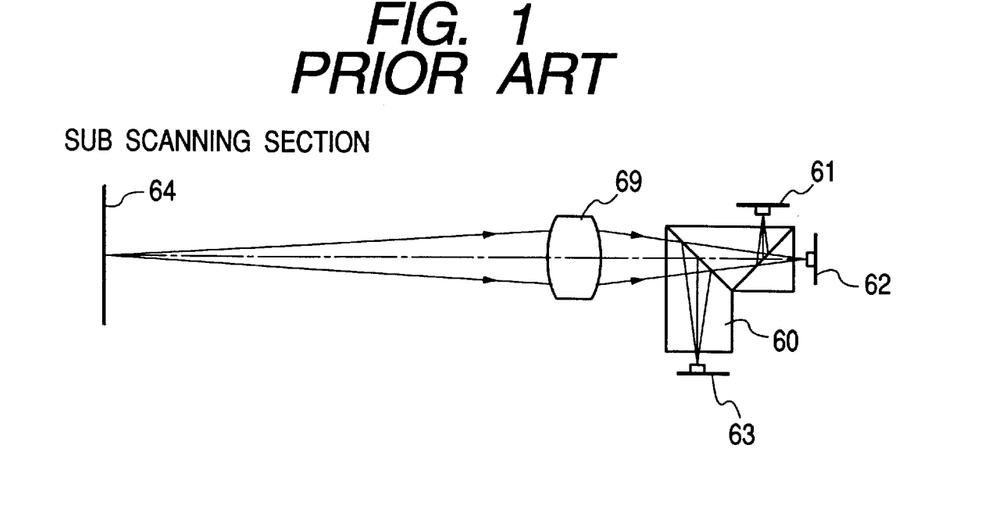
FIG. 1 is a schematic view showing principal parts of the optical system of a conventional color image reading apparatus.

FIG. 1 is a schematic view showing principal parts of an optical system of a conventional color image reading apparatus. In FIG. 1, when a light beam originating from a color image on an original surface 64 is focused and imaged by an imaging lens 69 on the surface of a line sensor (to be described below), the light beam is color-separated into three colors, i.e., red (R), green (G), and blue (B) via a 3P prism 60, and these color-separated light beams are respectively guided onto the surfaces of line sensors 61, 62, and 63. Color images formed on the surfaces of the line sensors 61, 62, and 63 are line-scanned in the sub scanning direction, thus reading images in units of colors.

Figure 2:
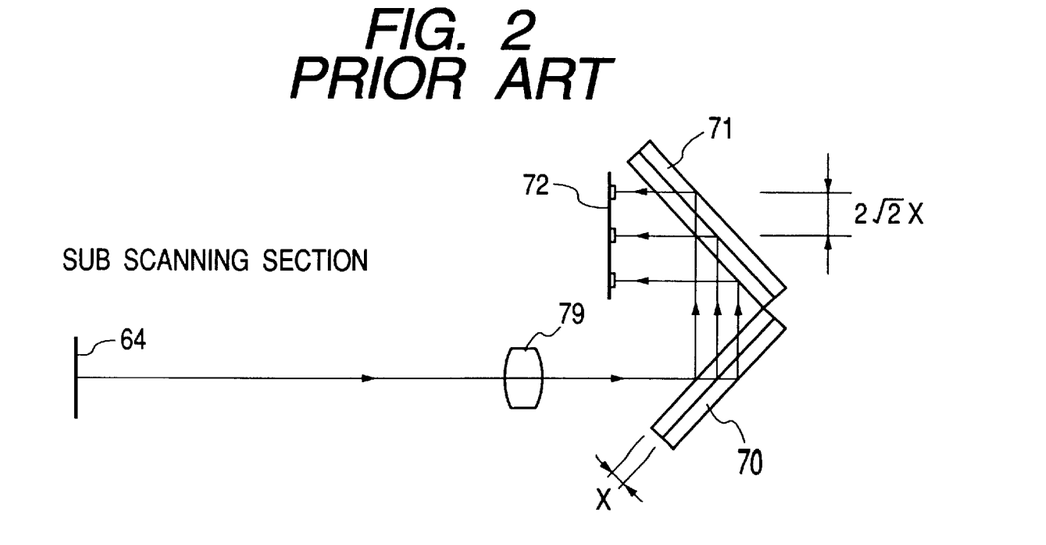
FIG. 2 is a schematic view showing principal parts of an optical system of another conventional color image reading apparatus.

FIG. 2 is a schematic view showing principal parts of an optical system of another conventional color image reading apparatus. In FIG. 2, when a light beam originating from a color image on an original surface 64 is focused and imaged by an imaging lens 79 on the surface of a line sensor (to be described later), the light beam is split into three light beams corresponding to the three colors via two color-separation beam splitters 70 and 71 each added with a wavelength selective transmission film having dichroism.

Color images based on the three color light beams are respectively imaged on the surface of a so-called monolithic 3-line sensor 72 arranged on a single substrate surface. The color images are line-scanned in the sub scanning direction to read images in units of colors.

Figure 3A:
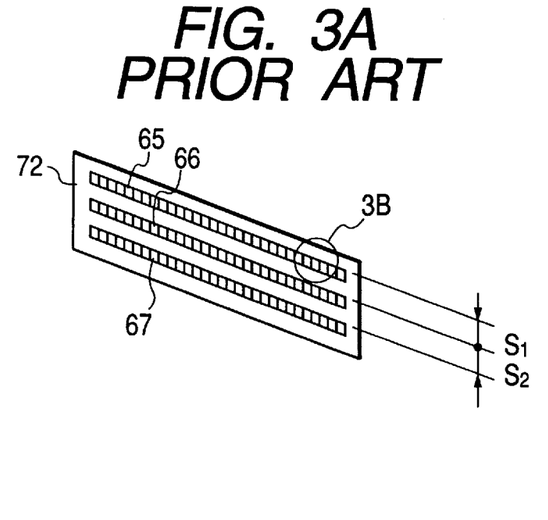
FIG. 3A is an explanatory view of a monolithic 3-line sensor.

FIG. 3A is an explanatory view of the monolithic 3-line sensor 72 shown in FIG. 2. As shown in FIG. 3A, the monolithic 3-line sensor 72 has three parallel line sensors (CCDs) 65, 66, and 67 which are placed on a single substrate surface and are spaced by a finite distance. Color filters (not shown) based on the respective color light beams are mounted on the surfaces of these line sensors.

Figure 3B:
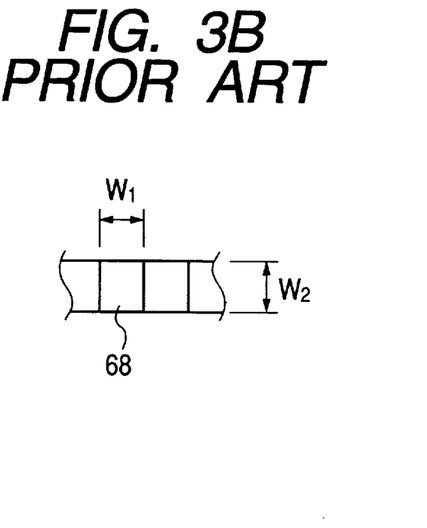
FIG. 3B is a partially enlarged view of FIG. 3A.

Spacings $S_1$ and $S_2$ between adjacent line sensors 65, 66, and 67 are normally set to fall within the range of about 0.064 to 0.2 mm under various manufacturing conditions. On the other hand, pixel widths $W_1$ and $W_2$ of one pixel 68 are set to be, e.g., in the neighborhood of 7 $\mu$m×7 $\mu$m or 10 $\mu$m×10 $\mu$m (see FIG. 3B).

The color image reading apparatus shown in FIG. 1 requires three independent line sensors, and requires high precision. In addition, the apparatus shown in FIG. 1 requires the 3P prism which is hard to manufacture. Hence, the entire apparatus becomes complicated and expensive. Furthermore, alignment between the imaging light beams and line sensors must be independently done three times, resulting in cumbersome assembly and adjustment.

On the other hand, in the color image reading apparatus shown in FIG. 2, if x represents the thickness of each of the beam splitters 70 and 71, the distance between adjacent lines of the line sensors is $2\sqrt{2}x$. If the preferred distance between adjacent lines of the line sensors in terms of manufacture is about 0.1 to 0.2 mm, the thickness x of the beam splitter 70 or 71 becomes about 35 to 70 $\mu$m.

In general, it is very hard to manufacture a beam splitter which has such small thickness and can optically maintain high flatness. When a beam splitter with such thickness is used, the optical performance of a color image to be formed on the line sensor surface lowers.

Figure 4A:
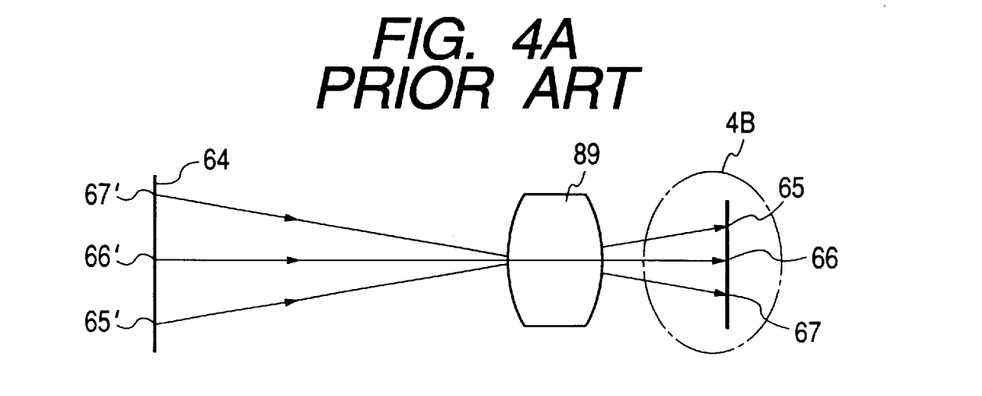
FIG. 4A is a schematic view showing principal parts of an optical system of still another conventional color image reading apparatus.
Figure 4B:
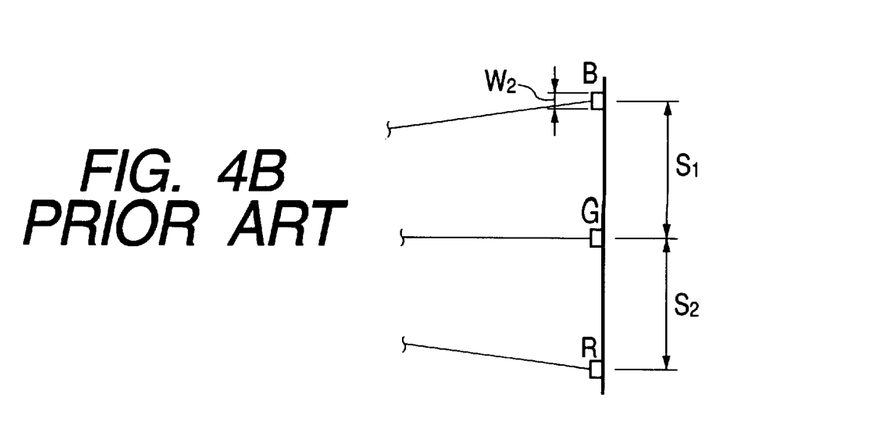
FIG. 4B is a partially enlarged view of FIG. 4A.

On the other hand, as shown in FIGS. 4A and 4B, the distances $S_1$ and $S_2$ between lines of the two line sensors 65 and 67 with respect to the central line sensor 66 of the monolithic 3-line sensor are normally set to be equal to each other in the opposite directions and to be integer multiples of the pixel size $W_2$ (see FIG. 4B) in the sub scanning direction for the reason given below.

That is, as shown in FIGS. 4A and 4B, when the monolithic 3-line sensor reads color images using a normal imaging optical system 89 alone, the reading positions on the original surface 64 that can be simultaneously read by the three line sensors 65, 66, and 67 are three different positions 65', 66', and 67', as shown in FIG. 4A.

For this reason, three color signal components (R, G, B) for an arbitrary position on the original surface 64 cannot be simultaneously read. Hence, after the images are read by the three line sensors, they must be aligned and synthesized.

In this processing, when the distances $S_1$ and $S_2$ between adjacent lines of the three line sensors are set to be integer multiples of the pixel size $W_2$ and corresponding redundant line memories are used, for example, the G and R signals (signal components based on the G and R color light beams) are delayed with respect to the B signal (a signal component based on the B color light beam), thereby relatively easily obtaining a synthesized signal component of three colors.

For this reason, the distances $S_1$ and $S_2$ of the two line sensors 65 and 67 with respect to the central line sensor 66 of the 3-line sensor are set to become integer multiples of the pixel size $W_2$ in the sub scanning direction.

However, upon assigning redundant line memories in correspondence with the line separations of the 3-line sensor in the above-mentioned color image reading apparatus, a plurality of arrays of expensive line memories must be arranged, and this results in very high cost and a complicated apparatus as a whole.

In general, the distances $S_1$ and $S_2$ between adjacent lines of the three line sensors preferably assume equal values to attain easy semiconductor processes.

Figure 5:
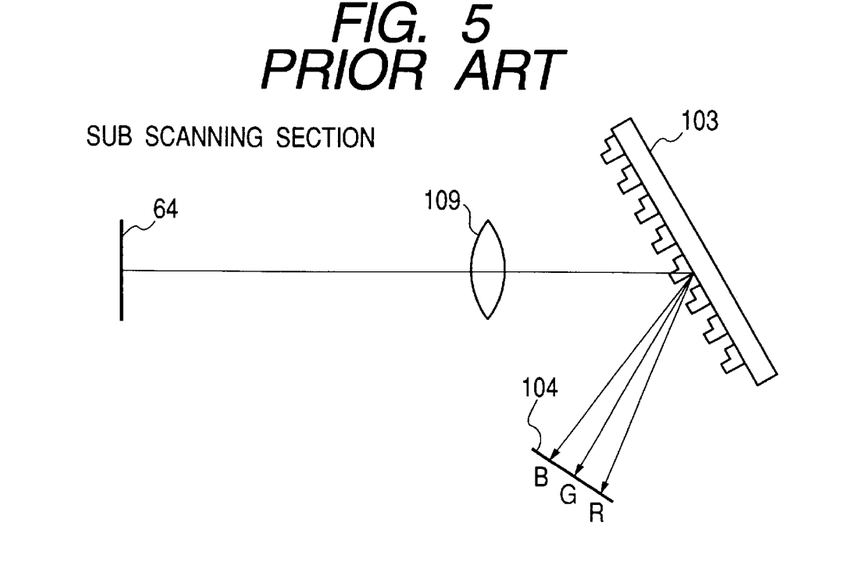
FIG. 5 is a schematic view showing principal parts of an optical system of yet another conventional color image reading apparatus.

As still another color image reading apparatus, the following apparatus has proposed by U.S. Pat. No. 5,223,703. In this apparatus, as shown in FIG. 5, a monolithic 3-line sensor is used as a light-receiving means (light-receiving element) 104, and a reflection type linear blazed diffraction grating 103 serving as a color-separation means is inserted in the imaging optical path to be spaced from the exit pupil of an imaging lens (projection lens) 109 in the direction of the surface of the light-receiving means 104. Color separation is attained using reflection and diffraction, and color image information for one line on the original surface 64 is color-separated and imaged on the surface of the 3-line color sensor 104, thereby reading the color image information.

The color image reading apparatus using the reflection type linear blazed diffraction grating as the color-separation means suffers the following problem.

Figure 6:
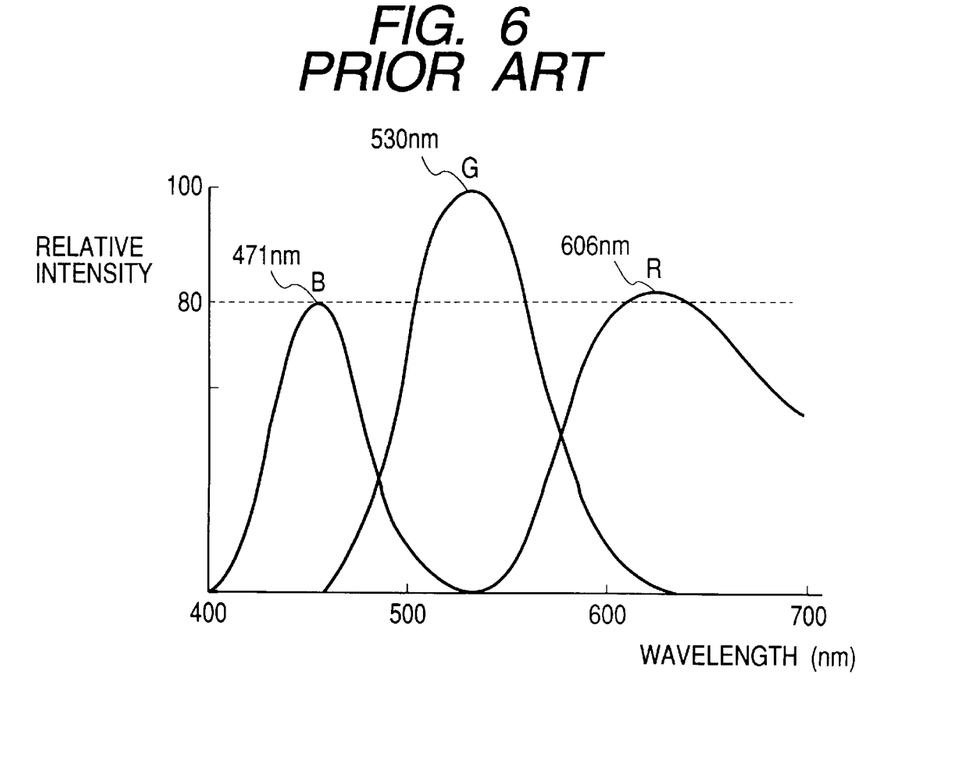
FIG. 6 is a graph for explaining the spectrum energy distributions of the respective orders by a linear blazed diffraction grating.

Limitations on the peak wavelengths, half-width wavelengths, overlap amounts of the colors, and the like are imposed on the reading wavelength ranges of the individual colors color-separated by a color-separation system. For example, assuming that the wavelength characteristics shown in FIG. 6 are ideal for a reading system, the angles of ±1st-order diffracted light components with respect to 0-order diffracted light do not match each other independently of the pitch of the reflection type linear blazed diffraction grating, and asymmetry remains. For this reason, the spacings between adjacent color light beams (color light spacings) on the surface of the 3-line sensor differ.

Hence, the conventional apparatus requires manufacture of a special sensor which has asymmetric line spacings (sensor spacings) in the sub scanning direction of the monolithic 3-line sensor, i.e., does not have general equal line spacings.

In order to solve such problem, Japanese Patent Application Laid-Open No. 8-223359 (corresponding to U.S. application Ser. No. 596,623 and EP Publication No. 0731598) has proposed an apparatus in which a dichroic mirror having at least two reflection surfaces is inserted in the optical path between a blazed diffraction grating and light-receiving means.

In the above reference, the R and B color light beams are reflected by the first reflection surface of the dichroic mirror, and the G color light beam is reflected by the second reflection surface of the dichroic mirror, thereby producing optical path differences between the R and B color light beams, and the G color light beam, and shifting the imaging positions of the three color light beams on the light-receiving means.

However, with this method, since the shift amount of the color light beams is determined by the spacing between the two reflection surface, it is hard to adjust the imaging positions.

SUMMARY OF THE INVENTION

It is an object of the present invention to provide a color image reading apparatus, which makes spacings of a plurality of color light beams color-separated in the sub scanning direction equal to each other on the surface of a light-receiving means (monolithic 3-line sensor) by correcting different imaging positions caused by different wavelengths of color light beams (diffracted light beams) color-separated by a diffraction grating using a correction means inserted in an optical path between a color-separation means and the light-receiving means using different refractive indices caused by the different wavelengths upon being transmitted through the correction means, upon reading a color image using the light-receiving means by color-separating a color image into a plurality of color light beams using a reflection or transmission type linear blazed diffraction grating serving as the color-separation means, and guiding the separated color light beams onto the surface of the light-receiving means.

In a color image reading apparatus according to the present invention, upon reading a color image using a light-receiving means having a plurality of line sensors arranged on a single substrate surface by imaging an incoming light beam onto the surface of the light-receiving means via a color-separation means comprising a linear blazed diffraction grating for color-separating the incoming light beam into a plurality of color light beams, a correction means for correcting different imaging positions on the surface of the light-receiving means caused by different wavelengths of the color light beams color-separated by the color-separation means is inserted into an optical path between the color-separation means and light-receiving means, and the correction means changes the optical paths of the color light beams using different refractive indices caused by the different wavelengths upon being transmitted through the correction means, so as to make spacings between adjacent color light beams color-separated in the sub scanning direction equal to each other on the surface of the light-receiving means.

Especially, the color image reading apparatus is characterized in that: the correction means comprises a plane-parallel glass which has a tilt with respect to the optical axis of the imaging optical system; the correction means comprises a prism; the linear blazed diffraction grating comprises a transmission type linear blazed diffraction grating; the linear blazed diffraction grating comprises a reflection type linear blazed diffraction grating; the correction means comprises a plane-parallel glass, the linear blazed diffraction grating comprises a transmission type linear blazed diffraction grating, and the plane-parallel glass and linear blazed diffraction grating are integrated and are obliquely disposed with respect to the optical axis of the imaging optical system; the correction means comprises a prism, the linear blazed diffraction grating comprises a reflection type linear blazed diffraction grating, and the prism and linear blazed diffraction grating are integrated; the color-separation means color-separates the incoming light beam into three color light beams in a direction perpendicular to the arrangement direction of pixels on the line sensor; and so on.

DETAILED DESCRIPTION OF THE PREFERRED EMBODIMENTS

Figure 7A:
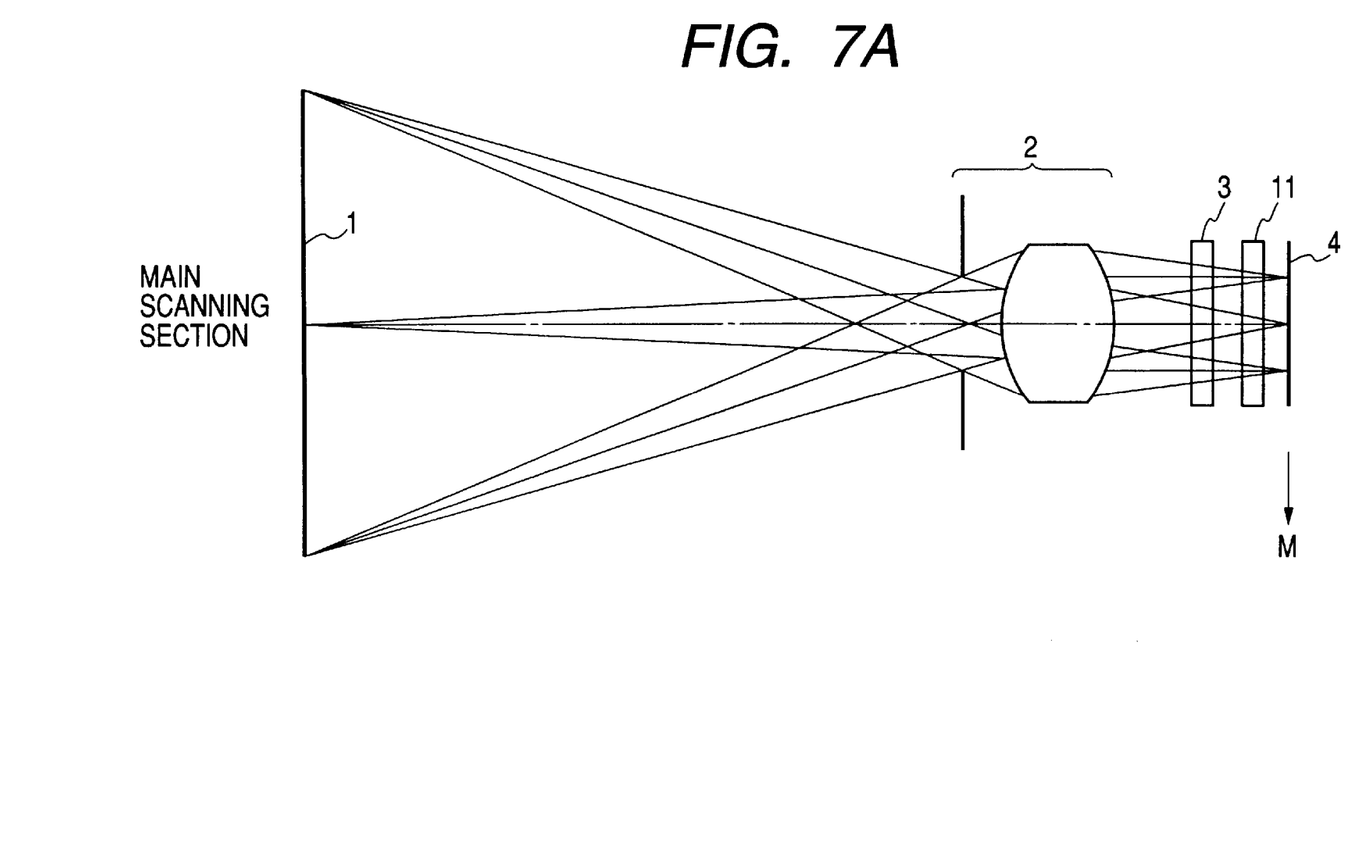
FIGS. 7A and 7B are schematic views showing the optical system of a color image reading apparatus according to the present invention.
Figure 7B:
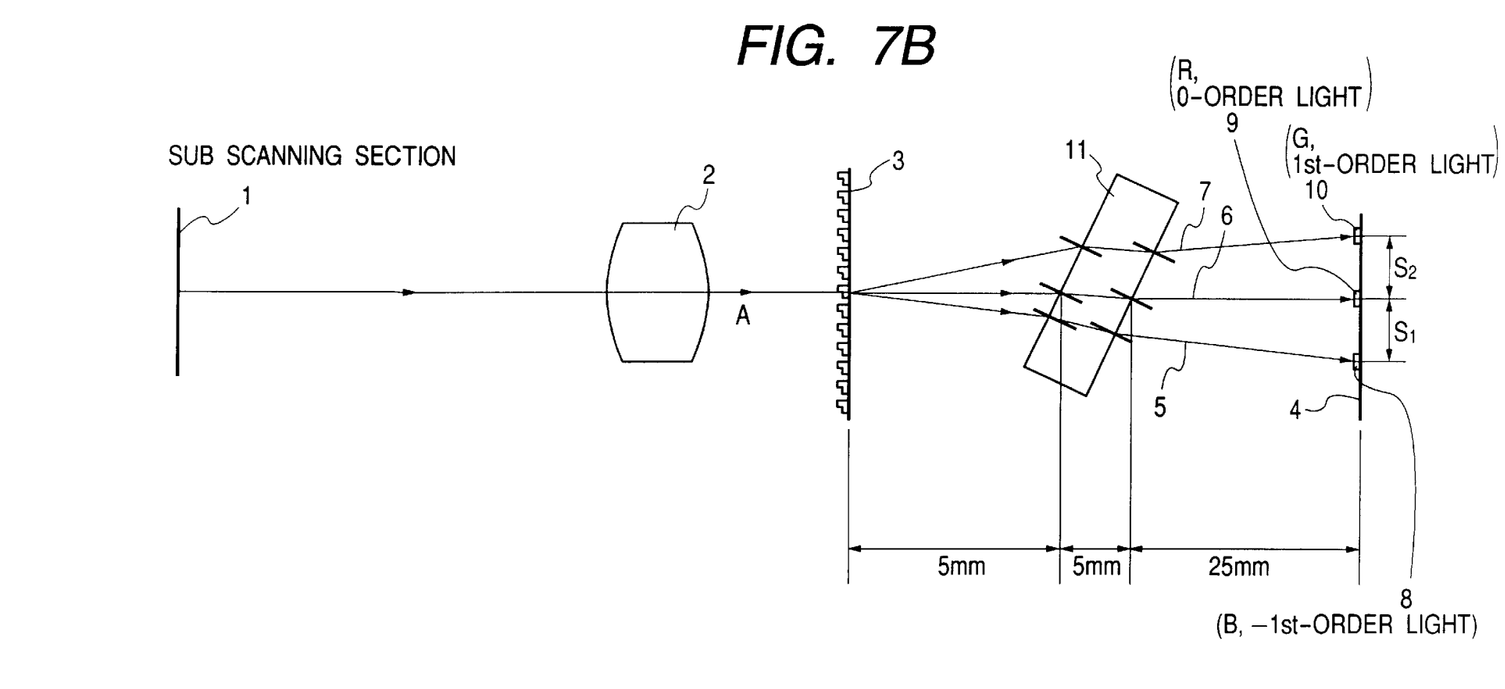

FIGS. 7A and 7B are respectively a plan view (main scanning section) and a side view (sub scanning section) of principal parts of an optical system according to the first embodiment of a color image reading apparatus of the present invention. The sub scanning section includes an optical axis and is perpendicular to the main scanning section.

In FIGS. 7A and 7B, a color image is formed on an original surface 1 as an object to be sensed. An imaging optical system 2 images a light beam based on the color image on the surface of a light-receiving means (monolithic 3-line sensor) via a transmission type linear blazed diffraction grating (to be described below).

A color-separation means 3 comprises a transmission type linear blazed diffraction grating, and separates by transmission and diffraction an incoming light beam into predetermined color light beams, e.g., R (red), G (green), and B (blue), three primary color light beams in a direction (sub scanning direction) perpendicular to the arrangement direction (main scanning direction) of pixels on the line sensor. In this embodiment, B color light is obtained by −1st-order diffracted light 5, R color light by 0-order diffracted light 6, and G color light by +1st-order diffracted light 7.

A light-receiving means 4 comprises a so-called monolithic 3-line sensor (to be also referred to as a "3-line sensor" hereinafter) on which three parallel line sensors (CCDs) 8, 9, and 10 are mounted on a single substrate surface to be spaced by equal spacings in the sub scanning direction. One pixel has a size of 8 $\mu$m×8 $\mu$m, and adjacent sensors are spaced by a spacing corresponding to eight lines.

A correction means 11 comprises a plane-parallel glass which consists of S-TIH11 (tradename: available from OHARA Corp.) has a tilt with respect to the optical axis of the imaging optical system 2. The correction means 11 corrects different imaging positions (focusing positions) in the sub scanning direction produced due to different wavelengths of diffracted light beams by changing (shifting) the optical paths of the color light beams using different refractive indices caused by different wavelengths (colors), so that spacings $S_1$ and $S_2$ between adjacent ones of a plurality of color light beams color-separated in the sub scanning direction become equal to each other on the surface of the 3-line sensor 4.

In this embodiment, the color image on the original surface 1 is line-scanned in the sub scanning direction by a scanning means comprising a mirror and the like (not shown), and a light beam coming from the color image illuminated by an illumination light source (not shown) is focused by the imaging optical system 2. The focused light beam is color-separated into three color light beams (R, G, and B) via the transmission type linear blazed diffraction grating 3, and color images are then formed on the surfaces of the corresponding line sensors 8, 9, and 10. Upon imaging, in this embodiment, the diffracted light beams of the respective orders color-separated by the linear blazed diffraction grating 3 are corrected by passing them through the plane-parallel glass 11 using different refractive indices (dispersion) of the color light beams produced upon transmitting through the plane-parallel glass 11, so that the spacings $S_1$ and $S_2$ between adjacent color beams color-separated in the sub-scanning direction become equal to each other on the surface of the 3-line sensor 4. The 3-line sensor digitally reads color images based on these color light beams. The line sensors 8, 9, and 10 extend in the main scanning direction agreeing with a direction M in FIG. 7A.

The transmission type linear blazed diffraction grating serving as the color-separation means separates an incoming light beam mainly into three directions by transmission and diffraction, as disclosed in Applied Optics, Vol. 17, No. 15, pp. 2273–2279 (Aug. 1, 1978).

The transmission type linear blazed diffraction grating separates a light beam, which enters the grating, and transmitted and diffracted, into three directions, i.e., the −1st-order diffracted light 5, 0-order diffracted light 6, and +1st-order diffracted light 7, and images them on the surface of the 3-line sensor 4 as light beams of focused spherical waves by the imaging optical system 2. In this embodiment, as described above, B color light is obtained by the −1st-order diffracted light 5, R color light by the 0-order diffracted light 6, and G color light by the +1st-order diffracted light 7.

Normally, when a light beam is color-separated and split into three, R, G, and B color light beams using 0-order diffracted light and ±1st-order diffracted light beams by only a blazed diffraction grating, the diffraction angles of the ±1st-order diffracted light components with respect to the 0-order diffracted light do not match each other independently of the grating pitch, and asymmetry remains. For this reason, the spacings between adjacent color light beams (color light spacings) on the surface of the 3-line sensor differ.

Figure 8A:
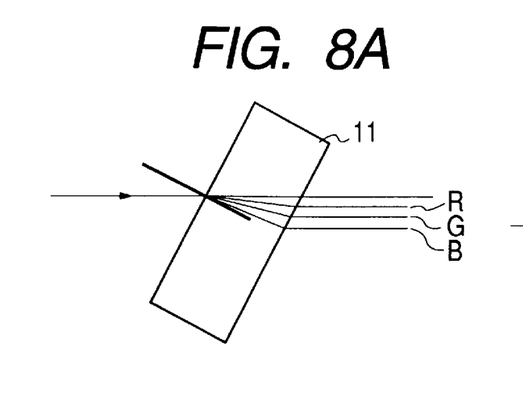
FIGS. 8A and 8B are explanatory views showing the relationship between the shift amounts of light rays and color light beams due to different refractive indices (dispersion) of the color light beams.
Figure 8B:
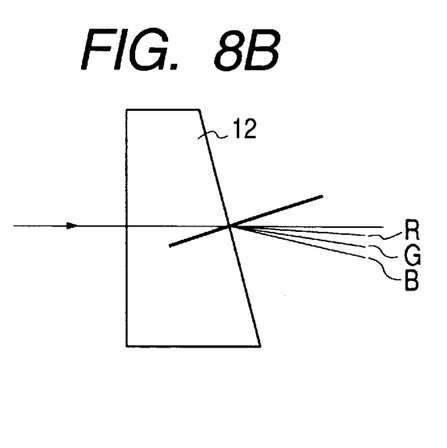

FIGS. 8A and 8B are explanatory views showing the relationship of the shift amounts of the respective wavelengths due to different refractive indices (dispersion) caused by different wavelengths (colors). Either when the plane-parallel glass 11 is obliquely disposed with respect to the optical axis, as shown in FIG. 8A, or when a prism 12 is used, as shown in FIG. 8B, a B light ray having the largest refractive index has the largest shift amount, and then G and R light rays come next.

Figure 9A:
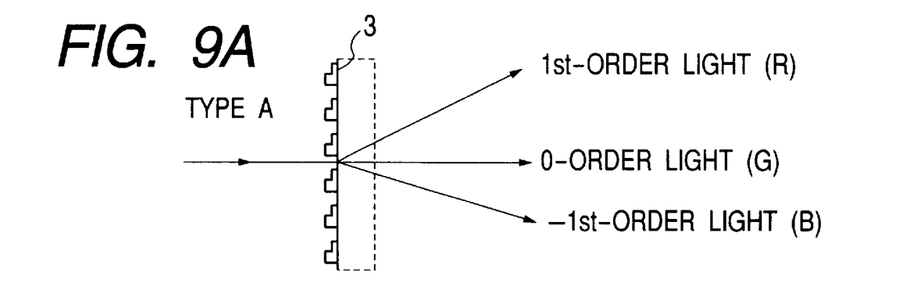
FIGS. 9A, 9B, and 9C are explanatory views showing the relationship between the orders of light rays and wavelengths separated by the blazed diffraction grating.
Figure 9B:
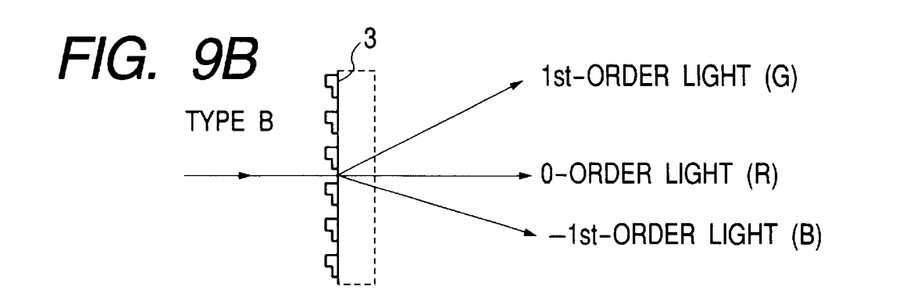
Figure 9C:
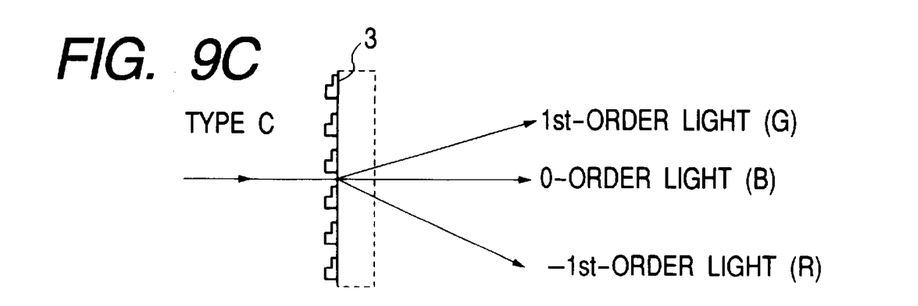

FIGS. 9A, 9B, and 9C are explanatory views showing the relationship between the orders of light rays separated by the blazed diffraction grating, and the wavelengths, and basically, only three patterns illustrated in these figures are available.

Type A shown in FIG. 9A uses a G light ray (G color light) as 0-order diffracted light, an R light ray (R color light) as 1st-order diffracted light, and a B light ray (B color light) as −1st-order diffracted light, and the diffraction angle of the R light ray having a longer wavelength is larger than that of the B light ray, thus causing asymmetry. In this embodiment, the asymmetry is corrected by shifting light rays using different refractive indices (dispersion) caused by different wavelengths. In this case, however, a good correction effect cannot be expected since both the line spacing between the 0- and 1st-order diffracted light beams, and that between the 0- and −1st-order diffracted light beams increase upon light ray shift due to dispersion.

Type B show in FIG. 9B uses an R light ray (R color light) as 0-order diffracted light, a G light ray (G color light) as 1st-order diffracted light, and a B light ray (B color light) as −1st-order diffracted light, and the diffraction angle of the G light ray having a longer wavelength is larger than that of the B light ray, thus causing asymmetry. In case of Type B, since the line spacing between the 0- and 1st-order diffracted light beams that make a larger diffraction angle decreases upon light ray shift due to dispersion, and the line spacing between the 0- and −1st-order diffracted light beams that make a smaller diffraction angle increases upon light ray shift, the asymmetric line spacings can be easily corrected.

Also, in Type C shown in FIG. 9C, since the line spacing between 0-diffracted light (B light ray) and −1st-order diffracted light (R light ray) that make a larger diffraction angle decreases upon light ray shift, and the line spacing between 0-order light (B light ray) and 1st-order diffracted light (G light ray) that make a smaller diffraction angle increases upon light ray shift, the asymmetric line spacings can be easily corrected.

For this reason, in this embodiment, as described above, B color light is obtained by the −1st-order diffracted light 5, R color light is obtained by the 0-order diffracted light 6, and G color light is obtained by the +1st-order diffracted light 7. In addition, a tilt angle θ the plane-parallel glass 11 inserted in the optical path between the blazed diffraction grating and 3-line sensor 4 makes with the optical axis is set to be 8.32°, a thickness d is set to be 5 mm, and a grating pitch P of the blazed diffraction grating 3 is set to be 263.90 μm. With this arrangement, the spacings $S_1$ and $S_2$ between adjacent color light beams color-separated in the sub scanning direction can be equal to each other on the surface of the 3-line sensor 4, and high-precision color image reading can be realized.

In this manner, in this embodiment, since the plane-parallel glass 11 is disposed to make a predetermined angle with the optical axis of the imaging optical system 2, as described above, the simple 3-line sensor 4 can read color image information with high precision by a simple arrangement without requiring high-precision adjustment.

Note that the tilt angle θ the plane-parallel glass 11 makes with the optical axis is preferably set to fall within the range from 1° to 40°. The thickness d of the plane-parallel glass 11 is preferably set to fall within the range from 1 mm to 25 mm.

In this embodiment, B color light is obtained by the −1st-order diffracted light 5, R color light is obtained by the 0-order diffracted light 6, and G color light is obtained by the +1st-order diffracted light 7. Alternatively, R color light may be obtained by the −1st-order diffracted light 5, B color light by the 0-order diffracted light 6, and G color light by the +1st-order diffracted light 7.

Figure 10:
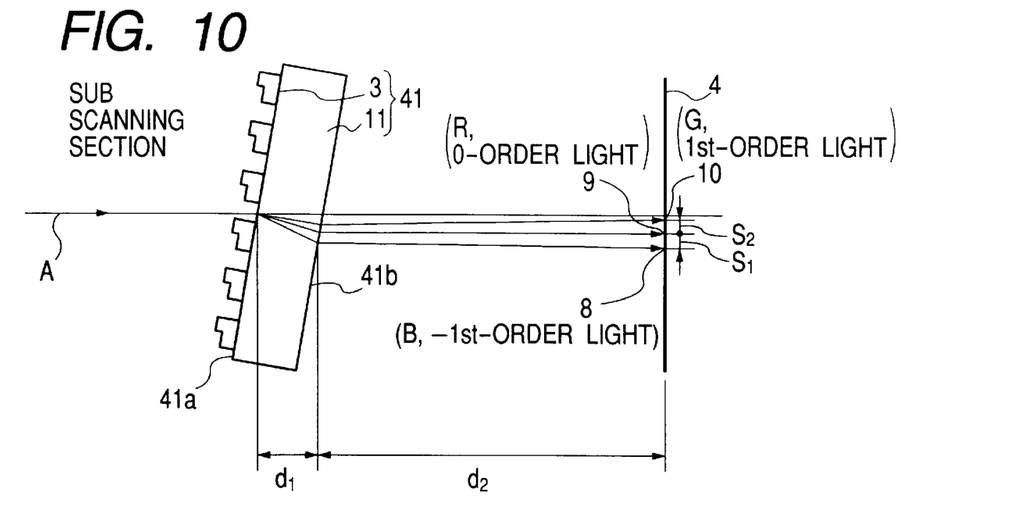
FIG. 10 is a side view (sub scanning section) showing principal part of the second embodiment of the present invention.

FIG. 10 is a sectional view of principal parts in the sub scanning direction of the second embodiment of the present invention. The same reference numerals in FIG. 10 denote the same parts as in FIGS. 7A and 7B.

In this embodiment, the difference from the first embodiment described above is that a transmission type blazed diffraction grating and plane-parallel glass are integrated, and are obliquely disposed with respect to the optical axis. Other arrangements and optical effects are substantially the same as those in the first embodiment, thus obtaining the same effect.

More specifically, an optical member 41 is formed by integrating a transmission type blazed diffraction grating 3 and plane-parallel glass 11, and is disposed to make a predetermined angle with the optical axis of an imaging optical system (not shown).

In this embodiment, B color light is obtained by −1st-order diffracted light 5, R color light by 0-order diffracted light 6, and G color light by +1st-order diffracted light 7, as in the first embodiment described above. In addition, the optical member 41 obtained by integrating the blazed diffraction grating 3 and plane-parallel glass 11 is tilted at an angle θ=8.44° with respect to the optical axis of the imaging optical system. Also, a grating pitch P of the blazed diffraction grating 3 is set to be 226.26 μm, a thickness $d_1$ of the plane-parallel glass 11 consisting of S-TIH11 (tradename) is set to be 5 mm, and a distance $d_2$ from an exit surface 41b where 0-order diffracted light (R color light) exits the plane-parallel glass 11 to the surface of a 3-line sensor 4 is set to be 25 mm. With this arrangement, the spacings $S_1$ and $S_2$ between adjacent color light beams color-separated in the sub scanning direction can be made equal to each other on the surface of the 3-line sensor 4, and high-precision color image reading can be realized.

As described above, in this embodiment, since the optical member 41 obtained by integrating the transmission type blazed diffraction grating 3 and plane-parallel glass 11 is inserted in the optical path to make a predetermined angle with the optical axis of the imaging optical system, the number of components can be reduced, and the simple 3-line sensor 4 can read color image information with high precision by a simple arrangement without requiring high-precision adjustment.

Figure 11:
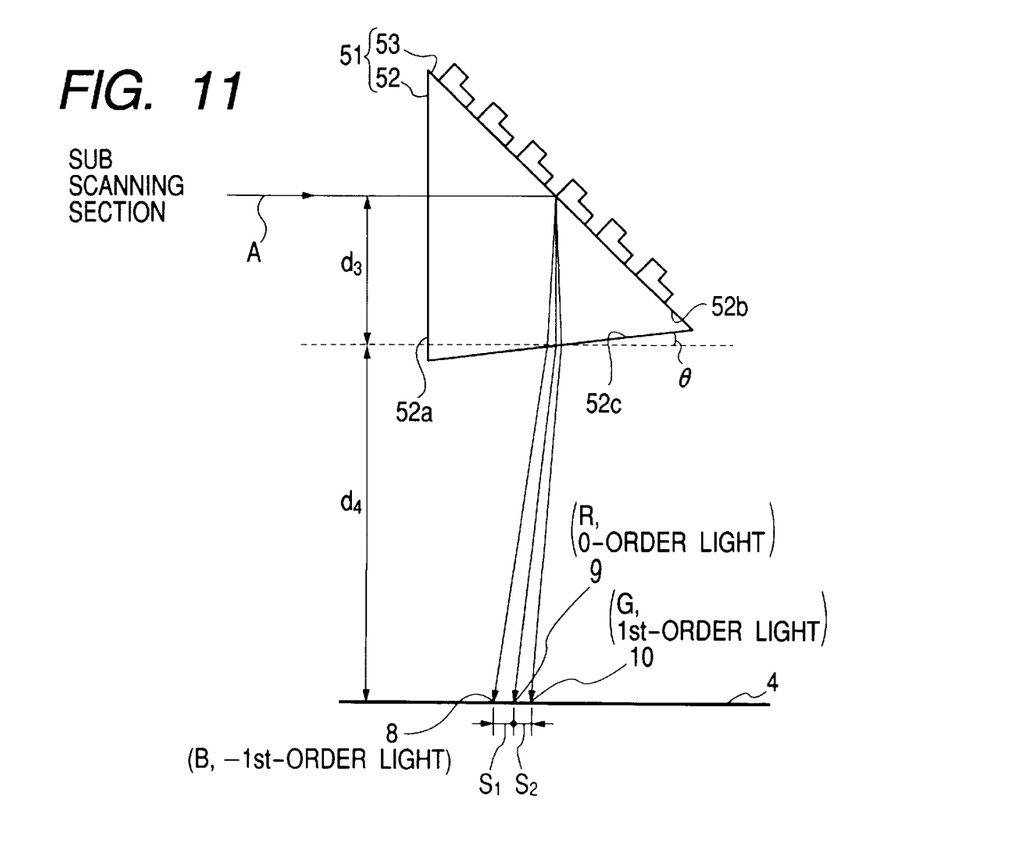
FIG. 11 is a side view (sub scanning section) showing principal part of the third embodiment of the present invention.

FIG. 11 is a sectional view of principal parts in the sub scanning direction of the third embodiment of the present invention. The same reference numerals in FIG. 11 denote the same parts as in FIGS. 7A and 7B.

In this embodiment, the difference from the first embodiment described above is that a reflection type blazed diffraction grating is used as a color-separation means, a prism is used as a correction means, and the reflection type blazed diffraction grating and prism are integrated. Other arrangements and optical effects are substantially the same as those in the first embodiment, thus obtaining the same effect.

More specifically, an optical member 51 is obtained by integrating a reflection type blazed diffraction grating 53 and a prism 52 consisting of S-TIH11 (tradename). B color light is obtained by −1st-order diffracted light 5, R color light by 0-order diffracted light 6, and G color light by +1st-order diffracted light 7, as in the first embodiment described above. Also, the optical member 51 obtained by integrating the blazed diffraction grating 53 and prism 52 is inserted in the optical path. Furthermore, a grating pitch P of the blazed diffraction grating 53 is set to be 314.82 μm, a prism surface 52c on the exit side of the prism 52 makes an angle θ=0.598° with the optical axis of an imaging optical system, a distance $d_3$ from a diffraction surface (reflection surface) 52b where a chief ray A of a light beam coming from the imaging optical system is reflected and diffracted by the blazed diffraction grating to the exit surface 52c where 0-order diffracted light (R color light) exits the prism 52 is set to be 6 mm, and a distance $d_4$ from that exit surface 52c to the surface of a 3-line sensor 4 is set to be 24 mm. With this arrangement, the spacings $S_1$ and $S_2$ between adjacent color light beams color-separated in the sub scanning direction can be made equal to each other on the surface of the 3-line sensor 4, and high-precision color image reading can be realized.

As described above, in this embodiment, since the reflection type blazed diffraction grating 53 and prism 52 are integrated, the number of components can be reduced, and the simple 3-line sensor 4 can read color image information with high precision by a simple arrangement without requiring high-precision adjustment.

In this embodiment, the reflection type blazed diffraction grating 53 and prism 52 are integrated. However, the present invention is not limited to such specific arrangement, and these components may be independently arranged.

In each of the above embodiments, the plane-parallel glass or prism is used as the correction means. However, the present invention can use any other optical elements that can change the optical paths of color light beams using different refractive indices caused by different wavelengths, as in the above embodiments.

According to the present invention, as described above, upon reading a color image by a light-receiving means by color-separating a color image into a plurality of color light beams using a reflection or transmission type linear blazed diffraction grating serving as a color-separation means, and guiding these light beams onto the surface of the light-receiving means, a correction means inserted in the optical path between the diffraction grating and light-receiving means corrects different imaging positions caused by different wavelengths of the color light beams (diffracted light beams) color-separated by the diffraction grating using different refractive indices due to different wavelengths (colors) upon transmitting through the correction means, thus making spacings between adjacent light beams color-separated in the sub scanning direction equal to each other on the surface of the surface of the light-receiving means. In this manner, a color image reading apparatus which can digitally read a color image with high precision using three, R, G, and B color light beams can be achieved.

What is claimed is:

1. A color image reading apparatus comprising:

light-receiving means in which a plurality of line sensors are arranged on a same substrate surface;

an imaging optical system for forming an image of an object;

a blazed diffraction grating disposed in an optical path between said imaging optical system and said light-receiving means, for color-separating a light beam from the object into a plurality of color light beams; and correction means, disposed in an optical path between said blazed diffraction grating and said light-receiving means, for correcting different imaging positions on a surface of said light-receiving means caused by different wavelengths of the plurality of color light beams color-separated by said blazed diffraction grating, said correction means changing respective optical paths of the color light beams utilizing different refractive indices due to different wavelengths upon being transmitted through said correction means so as to make spacings between adjacent color light beams color-separated in a sub scanning direction equal to each other on the surface of said light-receiving means.

2. An apparatus according to claim 1, wherein said imaging optical system forms the image of the object on the surface of said light-receiving means via said blazed diffraction grating and said correction means.

3. An apparatus according to claim 1, wherein said correction means comprises a plane-parallel glass which is tilted with respect to an optical axis of said imaging optical system.

4. An apparatus according to claim 1, wherein said correction means comprises a prism.

5. An apparatus according to claim 1, wherein said blazed diffraction grating comprises a transmission type linear blazed diffraction grating.

6. An apparatus according to claim 1, wherein said blazed diffraction grating comprises a reflection type linear blazed diffraction grating.

7. An apparatus according to claim 1, wherein said correction means comprises a plane-parallel glass, said blazed diffraction grating comprises a transmission type linear blazed diffraction grating, and said plane-parallel glass and said blazed diffraction grating are integrated and are obliquely disposed with respect to an optical axis of said imaging optical system.

8. An apparatus according to claim 1, wherein said correction means comprises a prism, said blazed diffraction grating comprises a reflection type linear blazed diffraction grating, and said prism and said blazed diffraction grating are integrated.

9. An apparatus according to claim 1, wherein said blazed diffraction grating color-separates an incident light beam into three color light beams in a direction perpendicular to an arrangement direction of pixels of said line sensors.

10. An apparatus according to claim 1, wherein said blazed diffraction grating color-separates the light beam from the object into a plurality of color light beams in a sub scanning direction, and said plurality of line sensors of said light-receiving means are arranged at equal spacings in the sub scanning direction.

* * * * *

UNITED STATES PATENT AND TRADEMARK OFFICE
CERTIFICATE OF CORRECTION

PATENT NO. : 6,064,057
DATED : May 16, 2000
INVENTOR(S) : Hidekazu Shimomura, et al.

Page 1 of 1

It is certified that error appears in the above-identified patent and that said Letters Patent is hereby corrected as shown below:

Column 2,
Line 59, "has" should read -- is --.

Column 3,
Line 41, "surface," should read -- surfaces, --.

Column 5,
Line 2, "part" should read -- parts --; and
Line 5, "part" should read -- parts --.

Column 6,
Line 15, "grating, and" should read -- grating, and is --.

Column 7,
Line 20, "angle θ" should read -- angle θ that --.

Column 9,
Line 1, "arrangement," should read -- arrangements, --;
Line 24, "the surface of" (second occurrence) should be deleted.

Signed and Sealed this

Twenty-first Day of August, 2001

Attest:

*Nicholas P. Godici*

NICHOLAS P. GODICI
*Attesting Officer*    *Acting Director of the United States Patent and Trademark Office*